(12) United States Patent
Alvarez et al.

(10) Patent No.: US 7,206,771 B2
(45) Date of Patent: Apr. 17, 2007

(54) AUTOMATED KNOWLEDGE SYSTEM FOR EQUIPMENT REPAIR BASED ON COMPONENT FAILURE HISTORY

(75) Inventors: Bruce H. Alvarez, South Burlington, VT (US); Steven R. Bergeron, Milton, VT (US); William J. Cavanaugh, Colchester, VT (US); Michael S. McClintock, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 10/605,979

(22) Filed: Nov. 11, 2003

(65) Prior Publication Data

US 2005/0102119 A1 May 12, 2005

(51) Int. Cl.
| | |
|---|---|
| G06F 17/00 | (2006.01) |
| G06F 11/00 | (2006.01) |
| G06F 7/00 | (2006.01) |
| G06F 19/00 | (2006.01) |
| G06F 11/30 | (2006.01) |
| G06F 15/00 | (2006.01) |
| G06N 5/00 | (2006.01) |
| G01M 17/00 | (2006.01) |
| G21C 17/00 | (2006.01) |

(52) U.S. Cl. .............. 706/45; 714/1; 701/29; 702/184; 702/185

(58) Field of Classification Search .......... 706/45; 702/183–185; 701/29–31; 714/1–2
See application file for complete search history.

(56) References Cited

U.S. PATENT DOCUMENTS

| | | | |
|---|---|---|---|
| 6,256,593 B1 | 7/2001 | Damon et al. | |
| 6,356,437 B1* | 3/2002 | Mitchell et al. | 361/683 |
| 6,484,128 B1* | 11/2002 | Sekiya et al. | 702/185 |
| 6,532,426 B1* | 3/2003 | Hooks et al. | 702/185 |
| 6,574,537 B2* | 6/2003 | Kipersztok et al. | 702/185 |
| 6,834,256 B2* | 12/2004 | House et al. | 702/181 |

(Continued)

Primary Examiner—David Vincent
Assistant Examiner—Benjamin Buss
(74) Attorney, Agent, or Firm—Gibb I.P. Law Firm, LLC; Richard M. Kotulak, Esq.

(57) ABSTRACT

The invention presents a computerized method for tracking equipment repair that begins by receiving an equipment identification of an item of equipment to be repaired from a user through a graphic user interface. The invention provides the user with a list of common problems for that item of equipment (and similar equipment) and a component hierarchy for the item of equipment. The invention allows the user to browse through multiple levels of the component hierarchy and select a major component, a minor component, or a subcomponent from the component hierarchy. The invention receives diagnosis input from the user optionally selecting one of the problems and/or a component from the component hierarchy and, in response, provides the user with detailed information regarding the problem or component selected by the user. Such detailed information comprises, for each direct subcomponent of the selected component (highest level if none selected), the number of failures, the probability of failure, the mean time between failures, the occurrence of the most recent failure for each component and the next expected failure, etc. Successful prior repairs for the same problem/component are presented including tool, date, time, technician, components involved and action taken. These successful repairs are linked to textual comments regarding the repair. Comments made for what is later determined to be an ineffectual repair are linked to the subsequent successful repair information.

33 Claims, 4 Drawing Sheets

U.S. PATENT DOCUMENTS

| | | |
|---|---|---|
| 6,907,545 B2 * | 6/2005 | Ramadei et al. .............. 706/45 |
| 2002/0035447 A1 | 3/2002 | Takahashi et al. |
| 2002/0138234 A1 | 9/2002 | Mikal et al. |
| 2003/0005486 A1 * | 1/2003 | Ridolfo et al. .............. 800/288 |
| 2003/0074159 A1 * | 4/2003 | Bechhoefer et al. ........ 702/181 |
| 2003/0149547 A1 | 8/2003 | Nakao et al. |
| 2003/0154051 A1 | 8/2003 | Okazaki et al. |
| 2003/0158705 A1 | 8/2003 | Ishii et al. |
| 2003/0191606 A1 * | 10/2003 | Fujiyama et al. ........... 702/185 |
| 2004/0250166 A1 * | 12/2004 | Dahlquist et al. ............. 714/37 |

* cited by examiner

AUTOMATED KNOWLEDGE SYSTEM FOR EQUIPMENT REPAIR BASED ON COMPONENT FAILURE HISTORY

BACKGROUND OF INVENTION

1. Field of the Invention

The present invention generally relates to the problem of excessive repair expense and increased equipment downtime due to inaccurate initial diagnosis of equipment failure.

2. Description of the Related Art

The present invention generally relates to the problem of excessive repair expense and increased equipment downtime due to inaccurate initial diagnosis of equipment failure. This problem can occur when maintenance personnel do not have access to historic information regarding similar or recent failures and repairs. It can also occur when a repair technician is inexperienced on the tool he or she is trying to repair, or is still in training.

The cause of an equipment failure in a factory is frequently not initially apparent. A maintenance technician will make a diagnosis and repair based on their training and experience level. With no access to historic data related to prior repairs, parts may be repaired or replaced without resolving the failure. Trial and error replacement of parts continues until the equipment is operational. Unnecessary replacement of parts results in extended equipment Mean Time To Repair (MTTR) and increased spending on components, some of which are quite expensive. This process results in additional equipment downtime if a new component is removed and returned to the spare parts inventory and the original part is reinstalled. An additional concern is that the lack of visibility to effective versus ineffective repairs can result in learning incorrect repair processes.

SUMMARY OF INVENTION

The invention presents a computerized method, system, service, etc. for tracking equipment repair that begins by receiving an equipment identification of an item of equipment to be repaired from a user through a graphic user interface. The invention provides the user with a list of common problems for that item of equipment (and similar equipment) and a component hierarchy for the item of equipment. The invention allows the user to browse through multiple levels of the component hierarchy and select a major component, a minor component, or a subcomponent from the component hierarchy.

The invention receives diagnosis input from the user optionally selecting one of the problems and/or a component from the component hierarchy and, in response, provides the user with detailed information based on prior failures for the problem and/or component selected by the user. Such detailed information comprises, for each direct subcomponent, the number of failures, the probability of failure, the mean time between failures, the occurrence of the most recent failure for each component and the next expected failure, etc. This process of providing the detailed information includes providing detailed information for similar equipment as a group, and lists detailed repair information for all successful repairs related to the selected problem and component (if any), with the most recent successful repairs being listed first. This detailed repair information can also include technician comments related to the repair and information regarding which repairs did not solve the problem. If no problem is selected by the user, the detailed repair information comprises all successful repairs for any problem and matching the component selected by the user, and if no components are selected by the user, the detailed repair information comprises solutions for repair of major components.

The invention receives history input from the user (after the item of equipment is repaired) regarding repair activities and the invention maintains a database of the detailed information based on the history input from the user. The invention calculates the mean time between failures by only using successful repairs and considers repairs that were repeated within a predetermined time of the most recent failure to be unsuccessful. The invention also keeps track of which piece of equipment required the repair. Tools of a similar type are stored in a database table keyed by group name which allows real time calculation of failures for similar tools. Further, the invention calculates the probability of failure (e.g., in real time) for each major component, subcomponent, etc., by calculating how often a certain component fails, or how often a certain component is the cause of a failure. The information regarding the mean time between failures and the time since the last actual failure maintained by the database is very useful to provide guidance as to whether a certain component should be expected to fail and is likely the cause of the problem.

Therefore, with the invention, historic information and calculated probability of component failure combined with even limited experience on the part of the technician will enable more accurate first time diagnosis of failures. The system provides an opportunity for cross training as technicians reference and learn from repair actions and comments entered by other technicians for past similar problems. This information is invaluable in determining which repair diagnosis and actions were successful and which were not.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF DRAWINGS

The invention will be better understood from the following detailed description with reference to the drawings, in which.

DETAILED DESCRIPTION

Figure 1:
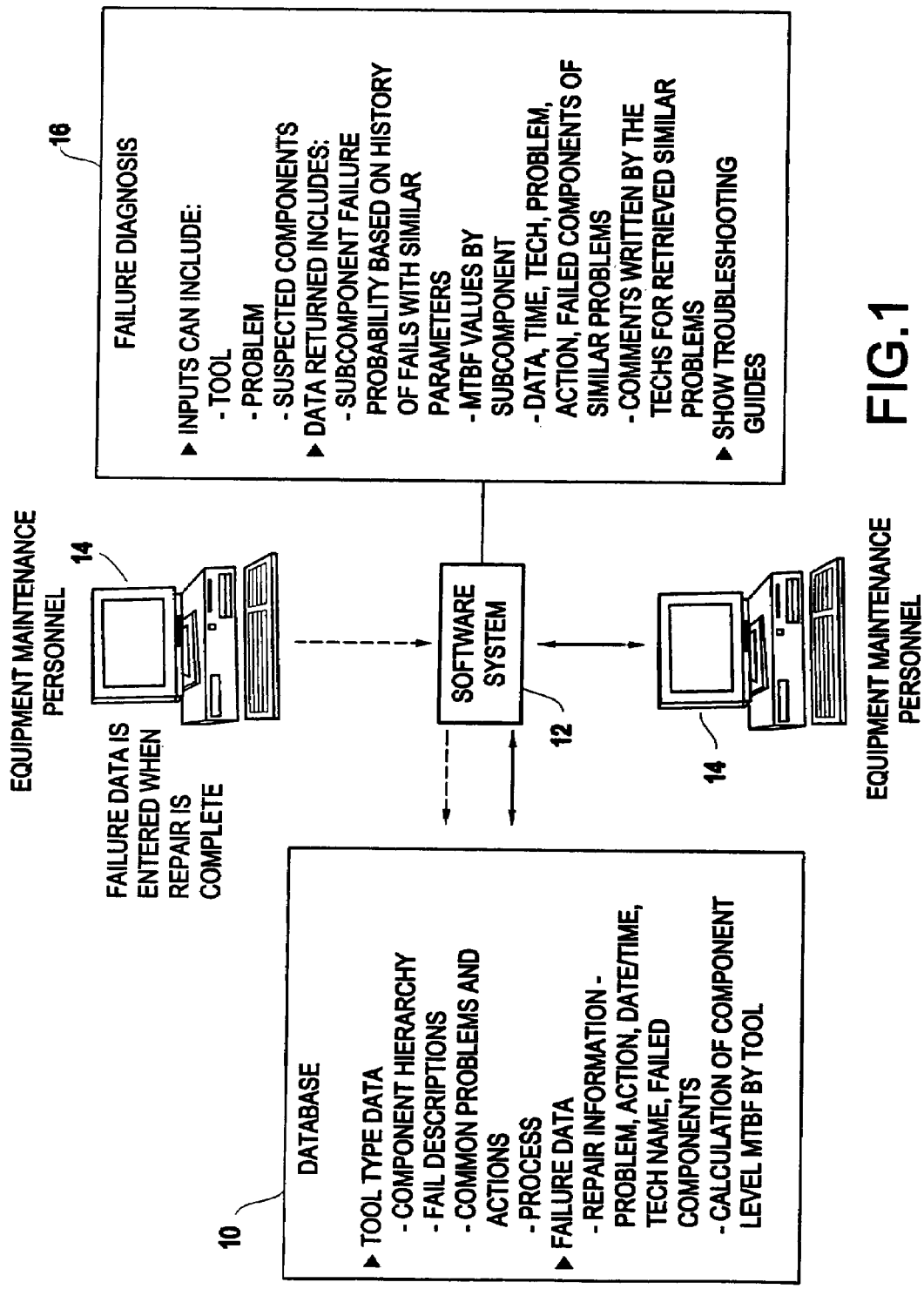
FIG. 1 is a schematic diagram of a system according to the invention.

The present invention and the various features and advantageous details thereof are explained more fully with reference to the nonlimiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention. The examples used herein are intended merely to facilitate an understanding of ways in which the invention may be practiced and to further enable those of skill in the art to practice the invention. Accordingly, the examples should not be construed as limiting the scope of the invention.

The invention is a computerized method that uses historic information to predict the likely cause of a current failure. The historic data is gathered when technicians enter information in the system every time a repair is completed. This includes tool ID, date/time, technician, problem, components involved, action taken and associated comments. The mean time before fail (MTBF) and next expected fail values are calculated from this information and stored for the problem and component hierarchy for the specific tool. If a problem recurs within a specified time frame, the prior fail diagnosis and repair is considered incorrect/unsuccessful and the MTBF values are recalculated with the unsuccessful repair being ignored. All comments entered at the time of the unsuccessful original repair are linked to the new repair to provide not only a history of what was useful, but also a history of what did not solve the problem, so as to allow future repairs to avoid the mistakes of the past.

The invention gives maintenance personnel specific probable failure analysis and historic repair information when they encounter a new failure. In one embodiment, the invention resides in a web based system and is accessible from any terminal (e.g., a wired terminal on a manufacturing floor, or through a wireless internet connection at a remote site serviced by a field technician).

FIG. 1 illustrates the database 10 that maintains the repair history. The database 10 includes data on the items of equipment (the "tool type data") including the component hierarchy, failure descriptions, common problems and actions, and processes used to repair the components. The database 10 also includes failure data and information about the repair including the problem, the action taken, the date and time of the repair, the technicians name, the failed components, etc. The invention calculates the mean time between failures by tool based upon this information. Item 12 represents the central processing unit running the invention as software within a computerized system and items 14 represent wired or wireless terminals connected to the central processing unit 12 through any form of computerized network.

In FIG. 1, item 16 represents the failure diagnosis provided to the technician by the invention. The technician inputs an identification of the tool (item of equipment), as well as optionally selecting the problem and the suspected defective components causing the problem. In response to the input provided by the technician, the invention provides the technician with data that will help solve the problem including the subcomponent failure probability (based on the history of failures with similar parameters), and the mean time before failure values by subcomponent. In addition, the invention provides the time, date, technician identification, problem identification, actions taken (successful and unsuccessful), failed components, technician's comments, etc. related to the previous repairs. This aspect of the invention can also provide troubleshooting guidelines and other similar documentation and repair instructions.

Therefore, the invention receives history input from the user (after the item of equipment is repaired) regarding repair activities and the invention maintains a database 10 of the detailed information based on the history input from the user 14. The invention recalculates and stores (using CPU 12) the mean time between failures by only using successful repairs and ignoring repairs that were effected within a predetermined time prior to of the most recent failure for the same problem and component set. More specifically, the invention records when each component fails on a specific piece of equipment and the common problem defining the failure to provide a history of how long each component operates properly before failure. The invention calculates one or more statistical values, such as mean (average), mode, median, etc. relating to when the component would normally be expected to fail on the specific machine. This information can then be retrieved and processed in a variety of ways, including grouping similar tools, predicting failure of components for a given problem (or any problem), predicting failure of any level of the component hierarchy, etc.

Further, the invention calculates the probability of failure for each major component, subcomponent, etc., by calculating how often a certain component fails, or how often a certain component is the cause of a failure over time. The information regarding the mean time between failures and the time since the last actual failure maintained by the database is very useful to provide guidance as to whether a certain component should be expected to fail and is likely the cause of the problem.

The database 10 also keeps track of technician comments related to the repair, linking those subsequently deemed ineffective (based on recurrence of the problem in a given time period) to the most recent repair. Therefore, if a component has been in place well past its expected useful life (based on repair history in the database 10), the technician can properly be more suspicious of the older component, and consider the component to more likely be a cause of the problem (and vice versa with respect to components that have not reached their life expectancy). When this information regarding whether a component has met or exceeded its life expectancy is combined with information regarding which repair activities were successful or unsuccessful, the probability that the repair technician will perform the proper repair the first time and avoid making unnecessary repairs is substantially increased. Further, this aspect of the invention helps reduce the time it takes to diagnose a problem because the invention relies upon statistical information (mean time before failure) to help guide the technician to the correct diagnoses.

The invention receives diagnosis input from the user optionally selecting one of the problems and/or a component from the component hierarchy and, in response, provides the user with detailed information regarding the problem or component selected by the user. Such detailed information comprises, for each direct subcomponent, the number of failures, the probability of failure, the mean time between failures, the occurrence of the most recent failure for each component, the next expected failure, etc. This process of providing the detailed information includes providing detailed information for similar equipment and all successful repairs related to the problem, with the most recent successful repairs being listed first. This detailed information can also include information regarding which repairs did not solve the problem. If no problem is selected by the user, the detailed information comprises all successful repairs matching the component selected by the user, and if no components are selected by the user, the detailed information comprises solutions for repair of major components.

Figure 2A:
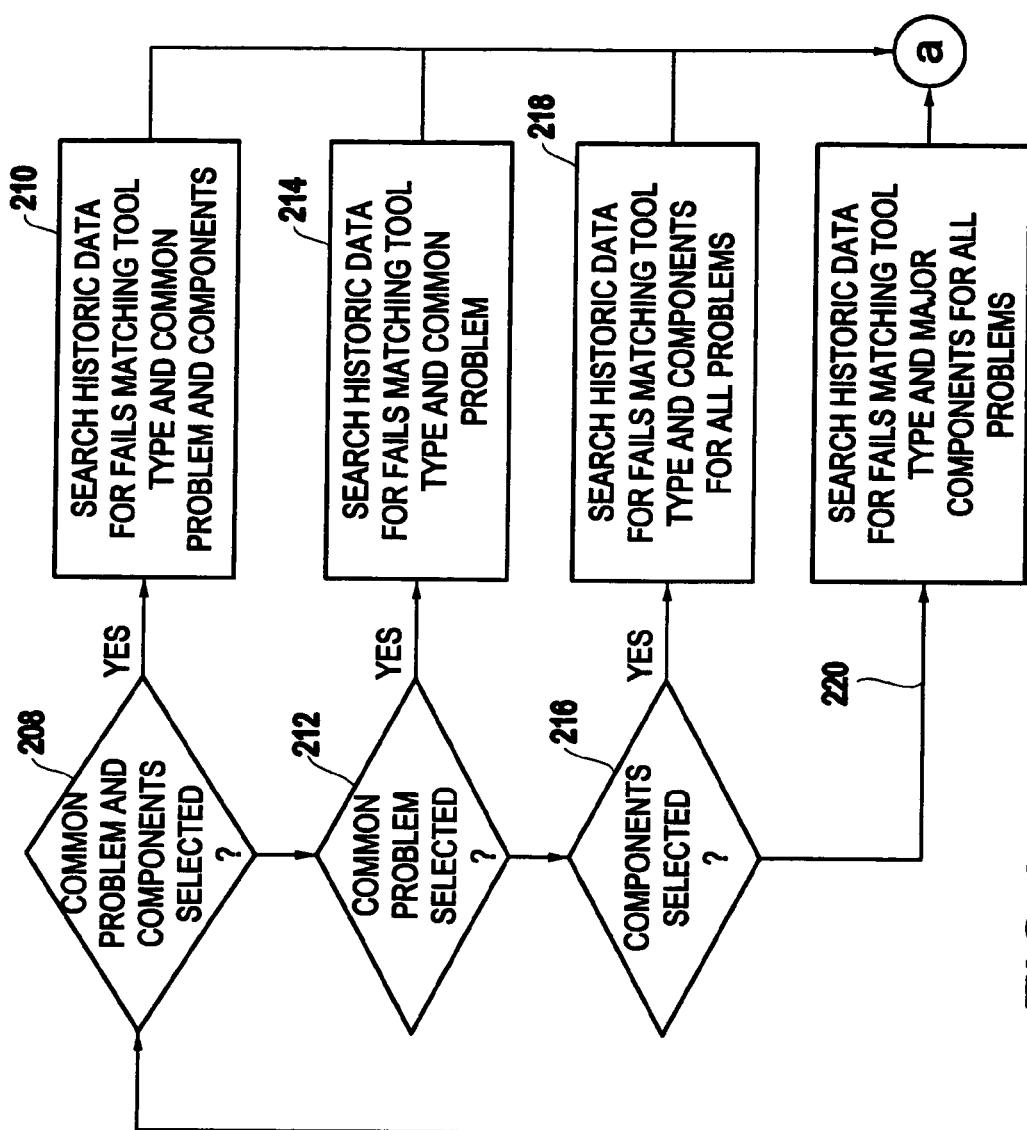
FIGS. 2A–2C is a flow diagram illustrating a preferred method of the invention.
Figure 2B:
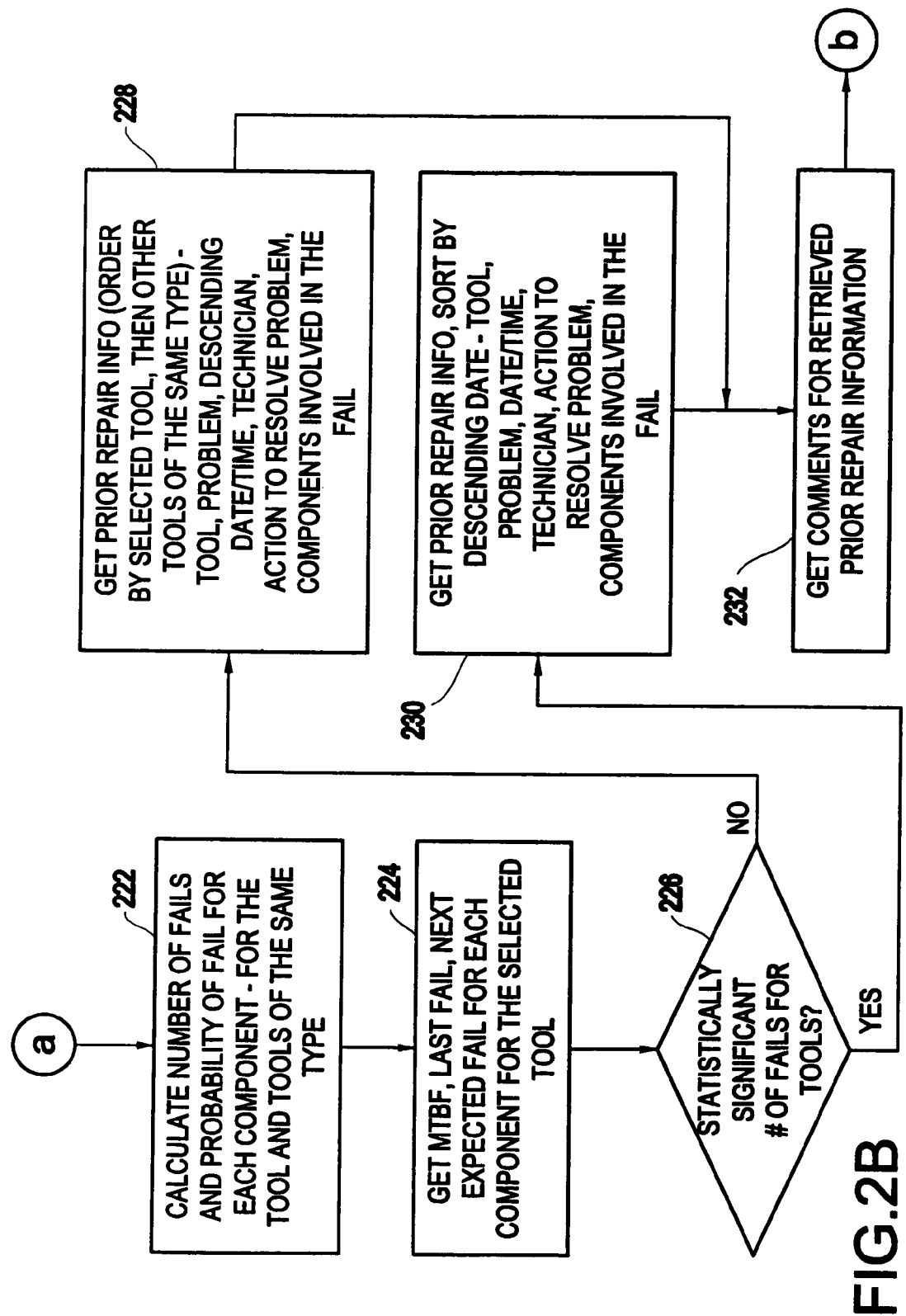
Figure 2C:
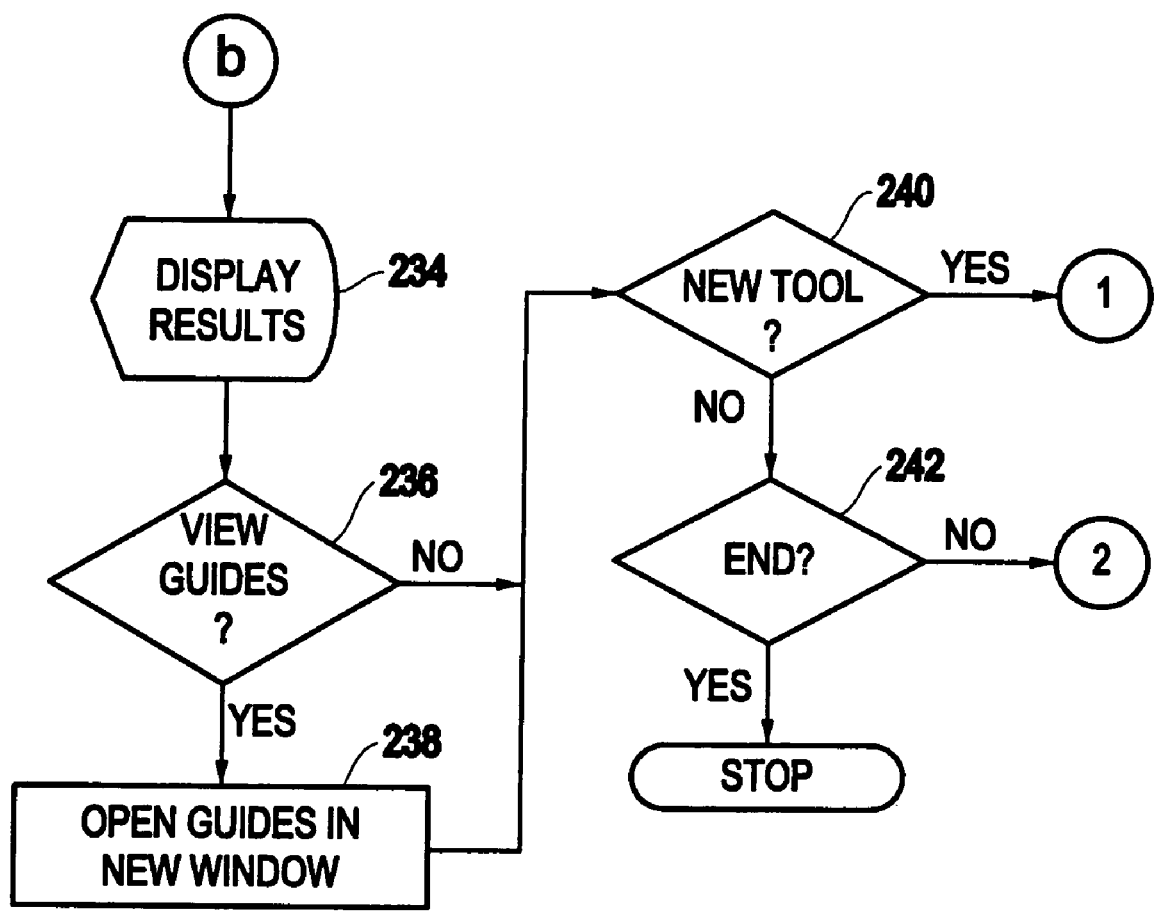

As shown in flowchart form in FIGS. 2A–2C, the technician enters a tool ID 200 and is presented with a list of common problems and the component hierarchy for tools of the same type 202. The technician can optionally select the common problem that describes the current failure 204 and/or optionally select a specific subcomponent using "drill down" through the component hierarchy if a particular area is suspect 206.

The system searches the history data for fails matching the chosen problem and components 210, 214, 218, 220. More specifically, if the user identifies a problem and components 208, the invention searches for the common problems and components of the identified tool (or matching tool type) 210. If the user identifies a problem 212, the invention searches for the common problems with the identified tool (or matching tool type) 214. If the user identifies components 216, the invention searches for the components of the identified tool (or matching tool type) 218. If the user does not select a common problem or component, the invention searches historical data for failures matching the tool type and major components for all problems 220. Thus, there are several special cases which will result in a modified view of the information. If no common problem is selected, the information is presented for all successful repairs matching the selected components without regard to the problem. If no subcomponents are chosen, the information is presented for the major components defined for the tool type relating to the common problem selected. There may be an insufficient number of prior fails for a particular tool to provide guidance. In this instance, successful repair and comment information for all tools of the same type will be displayed. Information for the selected tool is listed first, followed by information for the rest of the tool type.

Item 222 in FIG. 2B illustrates that the invention calculates the number of failures and probability of failure for each component, for each tool and tools of the same type. This processing can be done in response to a problem inquiry by a user or can be performed in advance with the results being stored in the database 10. In one embodiment, the probabilities of failure statistics are updated periodically, or each time a repair is made.

Then, depending upon the information input by the user, the invention retrieves the mean time before failure, last failure occurrence, next expected failure, etc. for each component of the selected tool. Item 226 represents a decision block as to whether a specific tool has a statistically significant number of failures. Therefore, if a certain tool is experiencing a higher level of failure that other similar tools, the technician can be so advised. More specifically, if a certain tool does not show a statistically significant number of failures, the invention retrieves the repair information for the tool and for other similar tools including the problem, date and time of last repair, technician who made the previous repairs, action taken to resolve the problem, components involved in the failure, etc., as shown in item 228. However, if a tool has a statistically significant number of failures, the invention retrieve similar information only for the specific tool as shown in item 230.

Therefore, if one individual piece of equipment tends to have a certain type of failure (that could be related to tool defect, tool usage, tool environment, etc.) that is unusual when compared to other similar tools, the technician is not provided with information regarding the other tools and is only provided information with respect to the tool in question. For example, a tool that is used within a harsh environment may suffer from repeated component failures that other similar tools used within mild environments do not suffer. Therefore, in such a situation, information regarding how other similar tools were repaired may be misleading for the tool that operates within the harsh environment. Once again, this decreases diagnostic time and increases the accuracy of the diagnoses by providing the technician with statistically relevant information.

Item 232 demonstrates that the invention also retrieves comments for associated prior repairs, which can include information relating to repairs that were not successful, in order to help the technician avoid making unnecessary and ineffectual repairs. Comments for a failed repair attempt are specially marked and shown along with the comments for the ultimately successful repair. This provides the ability for the technician to see what actions resolved similar failures. Equally important, it also lets them learn which actions were ineffective.

The technician then receives the following information (for each direct component for the tool) the number of fails (also for tools of the same type), the probability of failure (also for tools of the same type), MTBF, prior failure date/time, and the next expected fail date/time 234. Once a diagnosis has been made, the technician can directly access web based guides 236, 238 which contain step-by-step procedures, failure analysis guides and other documentation to complete the necessary repair. The process can then be repeated for a new tool 240, for the same tool 242, or ended. Thus, the technician may choose to select new sub components based on this information and start the search again 242. This provides the ability to drill down through the component hierarchy to find the predicted failure probability for any component.

Therefore, with the invention, information for all successful prior repairs (most recent first) which match the technician's input are provided to the technician. Historic information and calculated probability of component failure combined with even limited experience on the part of the technician will enable more accurate first time diagnosis of failures. The system provides an opportunity for cross training as technicians reference and learn from repair actions and comments entered by other technicians for past similar problems. This information is invaluable in determining which repair diagnosis and actions were successful and which were not.

Additionally, the invention allows the technician the ability to search the historical comment information for any combination of values. For instance, they may want to find all comments related to a particular tool, component, problem, or action taken.

The invention is applicable to all forms of equipment and all types of service industries that perform repairs including, manufacturing, construction, computers, automotive, appliances, industrial, household, medical, etc. Further, the invention is useful with all systems that use some form of computerized repair tracking including stand alone computer systems, local area networks, wide area networks, worldwide networks, wired and wireless systems, etc.

Other benefits of the invention include reduced tool down time, reduced problem determination time, and improved "fixed right the first time" statistics. The invention provides technicians the information they need in one place history, diagnostics and access to online repair manuals and instructions. The invention can also reduce unnecessary replacement of parts and associated costs as prior learning will show which repairs are effective and which are not. The invention also provides education of newer technicians at the time of repair using historical repair information, with less need to "consult the expert". The invention can also be used to manage spare parts inventory using "next predicted fail" data reducing the need to carry extra inventory common with "buy "n" parts when inventory reaches "x"" or "replace as used" schemes.

The invention claimed is:

1. A computerized method for tracking equipment repair comprising:
    receiving an equipment identification of an item of equipment to be repaired from a user;
    determining a number of prior failures for said item of equipment;
    providing said user with a list of common problems and a component hierarchy for said item of equipment;
    if no selection from said list of common problems and said component hierarchy is received from said user, providing said user with a plurality of statistical failure values and historic repair information for all major components related to all common problems;
    if a selection of at least one of a common problem from said list and a component from said component hierarchy is received from said user, providing said user with a plurality of statistical failure values and historic repair information for only selected components and components related to selected problems;
        wherein if said item of equipment has at least a predetermined number of said prior failures, then said historic repair information provided to said user is for said item of equipment alone; and
        wherein if said item of equipment has less than said predetermined number of said prior failures, then said historic repair information provided to said user is for said item of equipment and for other same type items of equipment.

2. The method in claim 1, wherein said receiving of said selection from said user further comprises allowing said user to browse through multiple levels of said component hierarchy and select at least one component from any level of said component hierarchy.

3. The method of claim 1, wherein said statistical failure values comprise the number of failures, the probability of failure, the mean time between failures, the occurrence of the most recent failure, and the next expected failure.

4. The method in claim 1, wherein if said selection comprises a common problem and no components, said historic repair information provided to said user further comprises all successful repairs and any comments regarding unsuccessful repairs of components related to said problem selected by said user, with the most recent successful repairs being listed first.

5. The method in claim 1, wherein if said selection comprises a component and no problems, said historic repair information provided to said user comprises all successful repairs and any comments regarding unsuccessful repairs of said component selected by said user.

6. The method in claim 1, further comprising calculating said statistical failure values based on successful repairs and not on unsuccessful repairs.

7. A computerized method for tracking equipment repair comprising:
    receiving an equipment identification of an item of equipment to be repaired from a user;
    determining a number of prior failures for said item of equipment;
    providing said user with a list of common problems and a component hierarchy for said item of equipment;
    if no selection from said list of common problems and said component hierarchy is received from said user, providing said user with a plurality of statistical failure values and historic repair information comprising all successful repairs and any comments regarding unsuccessful repairs for all major components related to all common problems; and
    if a selection of at least one of a common problem from said list and a component from said component hierarchy is received from said user, providing said user with a plurality of statistical failure values and historic repair information comprising all successful repairs and any comments regarding unsuccessful repairs for only selected components and components related to selected problems;
        wherein if said item of equipment has at least a predetermined number of said prior failures, then said historic repair information provided to said user is for said item of equipment alone;
        wherein if said item of equipment has less than said predetermined number of said prior failures, then said historic repair information provided to said user is for said item of equipment and for other same type items of equipment; and
        wherein said statistical failure values comprise the number of failures, the probability of failure, the mean time between failures, the occurrence of the most recent failure, and the next expected failure.

8. The method in claim 7, wherein said receiving of said selection further comprises allowing said user to browse through multiple levels of said component hierarchy and select at least one component from any level of said component hierarchy.

9. The method in claim 7, wherein if said selection comprises a common problem and no components, said detailed historic repair information provided to said user further comprises all successful repairs and any comments regarding unsuccessful repairs of components related to said problem selected by said user, with the most recent successful repairs being listed first.

10. The method in claim 7, wherein if said selection comprises a component and no problems, said detailed historic repair information provided to said user comprises all successful repairs and any comments regarding unsuccessful repairs of said selected by said user.

11. The method in claim 7, further comprising calculating said statistical failure values based on successful repairs and not on unsuccessful repairs.

12. A computerized method for tracking equipment repair comprising:
    maintaining a database containing data regarding items of equipment, said data comprising component hierarchies, failure descriptions, common problems associated with said items of equipment and historic repair information for said items of equipment;
    calculating and storing in said database statistical failure values for said components in said component hierarchies;
        wherein said statistical failure values comprise the number of failures, the probability of failure, the mean time between failures, the occurrence of the most recent failure, and the next expected failure; and
        wherein the mean time between failures is calculated by ignoring repairs where the same problem occurred within a predetermined time of the most recent failure;
    receiving an equipment identification of an item of equipment to be repaired from a user;

determining a number of prior failures for said item of equipment;

providing said user with a list of common problems and a component hierarchy for said item of equipment;

if no selection from said list of common problems and said component hierarchy is received from said user, providing said user with a plurality of said statistical failure values and with historic repair information comprising all successful repairs and any comments regarding unsuccessful repairs for all major components related to all common problems; and if a selection of at least one of a common problem from said list and a component from said component hierarchy is received from said user, providing said user with a plurality of said statistical failure values and with historic repair information comprising all successful repairs and any comments regarding unsuccessful repairs for only selected components and components related to selected problems;

wherein if said item of equipment has at least a predetermined number of said prior failures, then said historic repair information provided to said user is for said item of equipment alone; and wherein if said item of equipment has less than said predetermined number of said prior failures, then said historic repair information provided to said user is for said item of equipment and for other same type items of equipment.

13. The method in claim 12, wherein said receiving of said selection further comprises allowing said user to browse through multiple levels of said component hierarchy and select at least one component from any level of said component hierarchy.

14. The method in claim 12, wherein if said selection comprises a component and no problems, said historic repair information provided to said user comprises all successful repairs and any comments regarding unsuccessful repairs of said component selected by said user.

15. The method in claim 12, wherein if said selection comprises a problem and no components, said historic repair information provided to said user comprises all successful repairs and any comments regarding unsuccessful repairs of major components related to said problem selected by said user.

16. A computerized method for tracking equipment repair comprising:

maintaining a database containing data regarding items of equipment, said data comprising component hierarchies, failure descriptions, common problems associated with said items of equipment and historic repair information for said items of equipment;

calculating and storing in said database statistical failure values for said components in said component hierarchies;

wherein said statistical failure values comprise the number of failures, the probability of failure, the mean time between failures, the occurrence of the most recent failure, and the next expected failure and are calculated based on successful repairs and not unsuccessful repairs;

receiving an equipment identification of an item of equipment to be repaired from a user;

determining a number of prior failures for said item of equipment;

providing said user with a list of common problems and a component hierarchy for said item of equipment;

if no selection from said list of common problems and said component hierarchy is received form said user, providing said user with a plurality of said statistical failure values and with historic repair information comprising all successful repairs and any comments regarding unsuccessful repairs for all major components related to all common problems; and if a selection of at least one of a common problem from said list and a component from said component hierarchy is received from said user, providing said user with a plurality of said statistical failure values and with historic repair information comprising all successful repairs and any comments regarding unsuccessful repairs for only selected components and components related to selected problems;

wherein if said item of equipment has at least a predetermined number of said prior failures, then said historic repair information provided to said user is for said item of equipment alone;

wherein if said item of equipment has less than said predetermined number of said prior failures, then said historic repair information provided to said user is for said item of equipment and for other same type items of equipment.

17. The method in claim 16, wherein said receiving of said selection further comprises allowing said user to browse through multiple levels of said component hierarchy and select at least one component from any level of said component hierarchy.

18. The method in claim 16, wherein if said selection comprises a common problem and no components, said historic repair information provided further comprises all successful repairs and any comments regarding unsuccessful repairs of components related to said problem, with the most recent successful repairs being listed first.

19. The method in claim 16, wherein if said selection comprises a component and no problems, said historic repair information comprises all successful repairs and any comments regarding unsuccessful repairs matching said component selected by said user.

20. The method in claim 16, wherein said mean time between failures is further calculated by ignoring repairs where the same problem occurred within a predetermined time of the most recent failure.

21. A computerized service for tracking equipment repair comprising:

receiving an equipment identification of an item of equipment to be repaired from a user;

determining a number of prior failures for said item of equipment;

providing said user with a list of common problems and a component hierarchy for said item of equipment;

if no selection from said list of common problems and said component hierarchy is received from said user, providing said user with a plurality of statistical failure values and historic repair information for all major components related to all common problems: and if a selection of at least one of a common problem from said list and a component from said component hierarchy is received from said user, providing said user with a plurality of statistical failure values and historic repair information for only selected components and components related to selected problems;

wherein if said item of equipment has at least a predetermined number of said prior failures, then said historic repair information provided to said user is for said item of equipment alone; and wherein if said item of equipment has less than said predetermined number of said prior failures, then said historic repair information provided to said user is for said item of equipment and for other same type items of equipment.

22. The service in claim 21, wherein said receiving of said selection further comprises allowing said user to browse through multiple levels of said component hierarchy and select at least one component from any level of said component hierarchy.

23. The service in claim 21, wherein said statistical failure values comprise the number of failures, the probability of failure, the mean time between failures, the occurrence of the most recent failure, and the next expected failure.

24. The service in claim 21, wherein if said selection comprises a common problem and no components, said historic repair information provided to said user further comprises all successful repairs and any comments regarding unsuccessful repairs of components related to said problem selected by said user, with the most recent successful repairs being listed first.

25. The service in claim 21, wherein if said selection comprises a component and no problems, said historic repair information provided to said user comprises all successful repairs and any comments regarding unsuccessful repairs of said component selected by said user.

26. The service in claim 21, further comprising calculating said statistical failure values based on successful repairs and not on unsuccessful repairs.

27. A program storage device readable by computer tangibly embodying a program of instructions executable by said computer, said program of instructions comprising a method for tracking equipment repair comprising:
   receiving an equipment identification of an item of equipment to be repaired from a user;
   determining a number of prior failures for said item of equipment;
   providing said user with a list of common problems and a component hierarchy for said item of equipment;
   if no selection from said list of common problems and said component hierarchy is received from said user, providing said user with a plurality of statistical failure values and historic repair information for all major components related to all common problems; and
   if a selection of at least one of a common problem from said list and a component from said component hierarchy is received from said user, providing said user with a plurality of statistical failure values and historic repair information for only selected components and components related to selected problems;
      wherein if said item of equipment has at least a predetermined number of said prior failures, then said historic repair information provided to said user is for said item of equipment alone; and
      wherein if said item of equipment has less than said predetermined number of said prior failures, then said historic repair information provided to said user is for said item of equipment and for other same type items of equipment.

28. The program storage device in claim 27, wherein said receiving of said selection further comprises allowing said user to browse through multiple levels of said component hierarchy and select at least one component from any level of said component hierarchy.

29. The program storage device in claim 27, wherein said statistical failure values comprise the number of failures, the probability of failure, the mean time between failures, the occurrence of the most recent failure, and the next expected failure.

30. The program storage device in claim 27, wherein if said selection comprises a common problem and no components said historic repair information provided to said user further comprises all successful repairs and any comments regarding unsuccessful repairs of components related to said problem selected by said user, with the most recent successful repairs being listed first.

31. The program storage device in claim 27, wherein if said selection comprises a component and no problems, said historic repair information provided to said user comprises all successful repairs and any comments regarding unsuccessful repairs of said component selected by said user.

32. The program storage device in claim 27, wherein said method further comprises calculating said statistical failure values based on successful repairs and not on unsuccessful repairs.

33. A computerized system for tracking equipment repair comprising:
   means for receiving an equipment identification of an item of equipment to be repaired from a user;
   means for determining a number of prior failures for said item of equipment;
   means for providing said user with a list of common problems and a component hierarchy for said item of equipment;
   means for receiving from said user in response to said list of common problems and said component hierarchy one of no selection from said list of common problems and said component hierarchy and a selection of at least one of a common problem from said list and a component in said component hierarchy;
   means for providing said user with a plurality of statistical failure values and with historic repair information,
      wherein if said number of prior failures for said item of equipment is at least a predetermined number, then said historic repair information is for said item of equipment alone;
      wherein if said number of prior failures for said item of equipment is less than said predetermined number, then said historic repair information is for said item of equipment and for other same type items of equipment;
      wherein if said no selection is received from said user, then said historic repair information is for all major components related to all common problems; and
      wherein if said selection is received from said user, them said historic repair information is only for selected component and for components related to selected problems.

* * * * *